(12) United States Patent
Matsuda et al.

(10) Patent No.: US 9,714,035 B2
(45) Date of Patent: Jul. 25, 2017

(54) DECELERATION CONTROL SYSTEM, METHOD, AND COMPUTER-READABLE MEDIUM

(71) Applicant: TOYOTA JIDOSHA KABUSHIKI KAISHA, Toyota-shi, Aichi-ken (JP)

(72) Inventors: Akira Matsuda, Toyohashi (JP); Haruki Oguri, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/969,892

(22) Filed: Dec. 15, 2015

(65) Prior Publication Data

US 2016/0167656 A1 Jun. 16, 2016

(30) Foreign Application Priority Data

Dec. 16, 2014 (JP) ................... 2014-254093

(51) Int. Cl.
| | |
|---|---|
| *G06F 7/70* | (2006.01) |
| *G06F 19/00* | (2011.01) |
| *G06G 7/00* | (2006.01) |
| *B60W 30/18* | (2012.01) |
| *B60W 50/00* | (2006.01) |

(52) U.S. Cl.
CPC .. *B60W 30/18072* (2013.01); *B60W 50/0097* (2013.01); *B60W 2030/1809* (2013.01); *B60W 2050/0089* (2013.01); *B60W 2550/402* (2013.01)

(58) Field of Classification Search
None
See application file for complete search history.

(56) References Cited

U.S. PATENT DOCUMENTS

| | | | | |
|---|---|---|---|---|
| 5,805,103 A | * | 9/1998 | Doi | ................ B60K 31/0008 340/435 |
| 8,150,591 B2 | * | 4/2012 | Isaji | ................ B60W 30/146 340/425.5 |
| 8,543,320 B2 | * | 9/2013 | Zheng | ................ G08G 1/0129 701/117 |

(Continued)

FOREIGN PATENT DOCUMENTS

| | | |
|---|---|---|
| JP | 2009-012605 A | 1/2009 |
| JP | 2011-227833 A | 11/2011 |

*Primary Examiner* — Nicholas Kiswanto
*Assistant Examiner* — Kenny A Taveras
(74) *Attorney, Agent, or Firm* — Oliff PLC

(57) ABSTRACT

A deceleration control system includes: a travel distance acquisition unit configured to acquire a travel distance measured by a sensor of a vehicle; a measured distance recording unit configured to record a measured distance in a recording medium for each travel road segment through which the vehicle travels, the measured distance being the travel distance from a predetermined measurement start position; a reference position setting unit configured to set a reference position based on the measured distance and a deceleration position in which the vehicle decelerates, the reference position being a position located on the near side of the deceleration position by a predetermined reference distance; and a deceleration control unit configured to perform deceleration control based on the travel distance from the reference position.

8 Claims, 10 Drawing Sheets

(56) References Cited

U.S. PATENT DOCUMENTS

| | | | | |
|---|---|---|---|---|
| 2009/0265071 A1* | 10/2009 | Isaji | B60W 30/16 | |
| | | | 701/70 | |
| 2010/0256836 A1* | 10/2010 | Mudalige | G08G 1/163 | |
| | | | 701/2 | |
| 2013/0131925 A1* | 5/2013 | Isaji | B62D 6/00 | |
| | | | 701/41 | |
| 2013/0173084 A1* | 7/2013 | Tagawa | G06F 17/00 | |
| | | | 701/1 | |
| 2013/0179062 A1* | 7/2013 | Yasushi | G06F 17/00 | |
| | | | 701/123 | |
| 2014/0142797 A1* | 5/2014 | Otake | B60W 20/00 | |
| | | | 701/22 | |
| 2014/0309814 A1* | 10/2014 | Ricci | B60Q 1/00 | |
| | | | 701/2 | |
| 2014/0309849 A1* | 10/2014 | Ricci | B60Q 1/00 | |
| | | | 701/33.4 | |
| 2014/0309903 A1* | 10/2014 | Otake | G08G 1/166 | |
| | | | 701/70 | |
| 2016/0167656 A1* | 6/2016 | Matsuda | B60W 50/0097 | |
| | | | 701/70 | |
| 2016/0245658 A1* | 8/2016 | Niwa | G01C 21/32 | |
| 2016/0313730 A1* | 10/2016 | Ricci | G05D 1/0027 | |

* cited by examiner

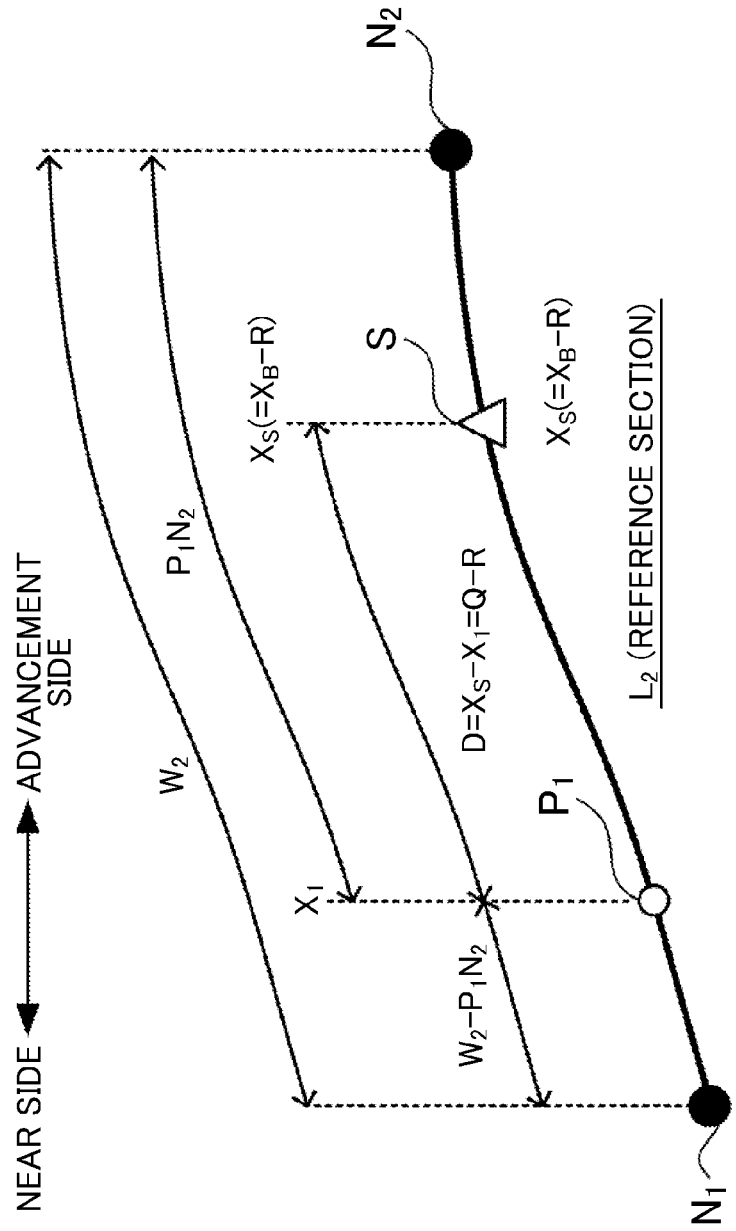

F I G . 3C
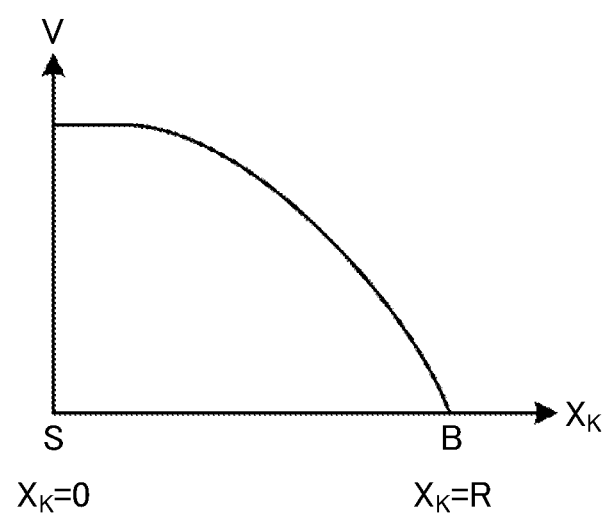

FIG. 5

| CHANGE POSITION | TRAVEL ROAD SEGMENT | MEASURED DISTANCE | DISTANCE-REMAINING-TO-CHANGE | SECTION LENGTH |
|---|---|---|---|---|
| $P_1$ | $L_2$ | $X_1$ | $P_1N_2$ | $W_2$ |
| $P_2$ | $L_3$ | $X_2$ | $P_2N_3$ | $W_3$ |
| $P_3$ | $L_4$ | $X_3$ | $P_3N_4$ | $W_4$ |
| ⋮ | ⋮ | ⋮ | ⋮ | ⋮ |

DECELERATION CONTROL SYSTEM, METHOD, AND COMPUTER-READABLE MEDIUM

INCORPORATION BY REFERENCE

The disclosure of Japanese Patent Application No. 2014-254093, filed on Dec. 16, 2014 including the specification, drawings and abstract is incorporated herein by reference in its entirety.

BACKGROUND OF THE INVENTION

1. Field of the Invention

The invention relates to a deceleration control system, method, and a computer-readable medium that stores a program for registering a subject point at which deceleration control is performed.

2. Description of Related Art

In a conventional technique (see Japanese Patent Application Publication No. 2011-227833 (JP 2011-227833 A)), deceleration control is performed when approaching a learned deceleration point. More specifically, in JP 2011-227833 A, guidance prompting a driver to decelerate is issued via a display device or a voice device at a timing where a vehicle passes a point located a predetermined distance on the near side of a stop line of an intersection serving as a deceleration point.

SUMMARY OF THE INVENTION

However, the vehicle may arrive at the deceleration point before a distance traveled from a point (referred to as a reference position hereafter) located a predetermined distance on the near side of the deceleration point reaches a predetermined distance, or the vehicle may arrive at the deceleration point after the distance traveled from the reference position reaches the predetermined distance, and in these cases, deceleration control cannot be performed appropriately on the basis of the travel distance from the reference position. The reason for this is that even when a distance between the deceleration point and the reference position on map data corresponds to the predetermined distance, a travel distance actually traveled by the vehicle from the reference position to the deceleration point does not necessarily match the predetermined distance. For example, when a distance of a curve section between the deceleration point and the reference position on the map data is derived from a length of an approximated curve formed from shape interpolation points in map information and the vehicle travels through the curve section on an outer side of the approximated curve, the vehicle arrives at the deceleration point after the distance traveled from the reference position reaches the predetermined distance. Conversely, when the vehicle travels through the curve section on an inner side of the approximated curve, the vehicle arrives at the deceleration point before the distance traveled from the reference position reaches the predetermined distance. The invention provides a technique of performing deceleration control appropriately using a position located on the near side of a deceleration position as a reference.

A first aspect of the invention is a deceleration control system including:
a travel distance acquisition unit configured to acquire a travel distance measured by a sensor of a vehicle;
a measured distance recording unit configured to record a measured distance in a recording medium for each travel road segment through which the vehicle travels, the measured distance being the travel distance from a predetermined measurement start position;
a reference position setting unit configured to set a reference position on the basis of the measured distance and a deceleration position in which the vehicle decelerates, the reference position being a position located on a near side of the deceleration position by a predetermined reference distance; and
a deceleration control unit configured to perform deceleration control on the basis of the travel distance from the reference position.

A second aspect of the invention is a deceleration control method including:
acquiring a travel distance measured by a sensor of a vehicle;
recording a measured distance in a recording medium for each travel road segment through which the vehicle travels, the measured distance being the travel distance from a predetermined measurement start position;
setting a reference position on the basis of the measured distance and a deceleration position in which the vehicle decelerates, the reference position being a position located on a near side of the deceleration position by a predetermined reference distance; and
performing deceleration control on the basis of the travel distance from the reference position.

A third aspect of the invention is a computer-readable medium that stores a deceleration control program, the deceleration control program including:
acquiring in use of a computer a travel distance measured by a sensor of a vehicle;
recording in use of the computer a measured distance in a recording medium for each travel road segment through which the vehicle travels, the measured distance being the travel distance from a predetermined measurement start position;
setting in use of the computer a reference position on the basis of the measured distance and a deceleration position in which the vehicle decelerates, the reference position being a position located on the near side of the deceleration position by a predetermined reference distance; and
performing in use of the computer deceleration control on the basis of the travel distance from the reference position.

In the aspects described above, the reference position can be set on the basis of the measured distance, i.e. the travel distance measured by the sensor of the vehicle in each travel road segment, instead of a distance on a map from the deceleration position. Therefore, the reference position can be set on the basis of the actual travel distance to the deceleration position, and as a result, deceleration control can be performed appropriately on the basis of the distance traveled from the reference position.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 3B is a pattern diagram showing a road;
FIG. 3C is a graph showing a target vehicle speed;
FIG. 5 is a table showing content recorded in a measured distance database (DB).

DETAILED DESCRIPTION OF EMBODIMENTS

Here, an embodiment of the invention will be described sequentially.

Figure 1:
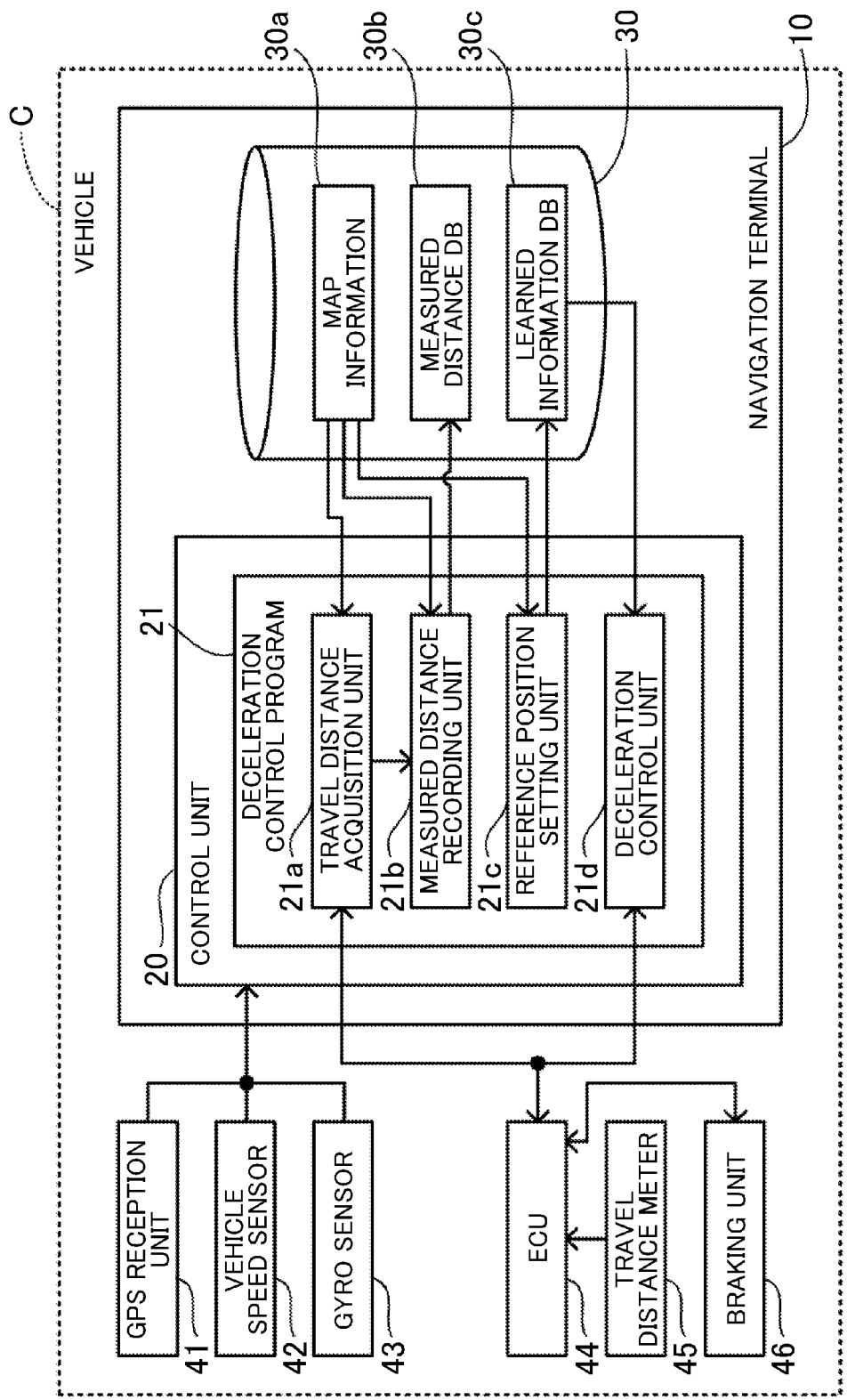
FIG. 1 is a block diagram showing a navigation terminal serving as a deceleration control system.

FIG. 1 is a block diagram showing a configuration of a navigation terminal 10 serving as a deceleration control system according to this embodiment. The navigation terminal 10 is installed in a vehicle C that travels along a road. The navigation terminal 10 includes a control unit 20 having a CPU, a RAM, a ROM, and so on, and a recording medium 30. The control unit 20 executes programs stored in the recording medium 30 and the ROM. In this embodiment, the control unit 20 executes a deceleration control program 21 as one of the programs.

Further, the vehicle C includes a GPS reception unit 41, a vehicle speed sensor 42, a gyro sensor 43, an electronic control unit (ECU) 44, a travel distance meter 45, and a braking unit 46. The GPS reception unit 41 receives radio waves from a GPS satellite, and outputs a signal used to calculate a current position of the vehicle C via an interface, not shown in the drawing. The control unit 20 obtains the current position of the vehicle C by obtaining this signal. The vehicle speed sensor 42 outputs a signal corresponding to a rotation speed of a vehicle wheel included in the vehicle C. The control unit 20 obtains the vehicle speed by obtaining this signal via an interface, not shown in the drawing. The gyro sensor 43 detects an angular acceleration relative to rotation of the vehicle C in a horizontal plane, and outputs a signal corresponding to an orientation of the vehicle C. The control unit 20 obtains an advancement direction of the vehicle C by obtaining this signal. The vehicle speed sensor 42, the gyro sensor 43, and so on are used to specify a travel locus of the vehicle C. In this embodiment, the control unit 20 specifies a travel road segment, which is a road segment having a position and a shape that match the travel locus of the vehicle C, and specifies the current position of the vehicle C within the travel road segment. More specifically, the travel road segment is specified on the basis of the travel locus of the vehicle C and map information 30a (shape interpolation point data of the map information 30a, to be described below). Further, the control unit 20 corrects the travel locus of the vehicle C on the basis of the signal output by the GPS reception unit 41.

The ECU 44 is a computer used to control respective parts of the vehicle C. The ECU 44 is capable of communicating with the control unit 20, and therefore capable of controlling the respective parts of the vehicle C in response to commands from the control unit 20. The travel distance meter 45 includes a sensor that measures a distance traveled by the vehicle C. More specifically, the travel distance meter 45 includes a rotation sensor that measures a rotation speed of a member (an axle, for example) that connects the vehicle wheels of the vehicle C. The travel distance meter 45 calculates a speed of the vehicle C from the rotation speed measured by the rotation sensor, and calculates the travel distance from the calculated speed. The travel distance meter 45 measures a lifetime travel distance, which is a distance traveled by the vehicle C from manufacture onward The travel distance meter 45 outputs the lifetime travel distance to the ECU 44, and the ECU 44 outputs the lifetime travel distance to the control unit 20. The braking unit 46 is a mechanism for generating braking force, such as a friction brake, an engine brake, or a regenerative brake. The ECU 44 causes the braking unit 46 to generate braking force in response to an operation of a brake pedal by a driver, and causes the braking unit 46 to generate braking force in response to a command from the control unit 20.

The map information 30a is recorded in the recording medium 30. The map information 30a includes node data indicating positions, altitudes, and so on of nodes set on the road along which the vehicle C travels, shape interpolation data indicating positions, altitudes, and so on of shape interpolation points used to specify shapes of road segments between the nodes, link data indicating information (section lengths and so on) relating to the road segments linking the nodes, and so on. The control unit 20 can specify a road shape on the basis of the node data and the shape interpolation data indicated by the map information 30a. The shape interpolation points are points provided in approximately central positions in a width direction of the road.

A measured DB 30b is recorded in the recording medium 30. The measured distance DB 30b is a database in which a measured distance of the vehicle C is recorded for each travel road segment. The measured distance is a distance traveled by the vehicle C from a predetermined measurement start position, and is obtained by subtracting the lifetime travel distance at the measurement start position from the lifetime travel distance at a desired measurement position. The measurement start position according to this embodiment is a position at a point where a power supply of the navigation terminal 10 is switched ON. A learned information DB 30c is recorded in the recording medium 30. The learned information DB 30c is a database in which a reference position is recorded in relation to each deceleration position in which the vehicle C decelerates.

Figure 2A:
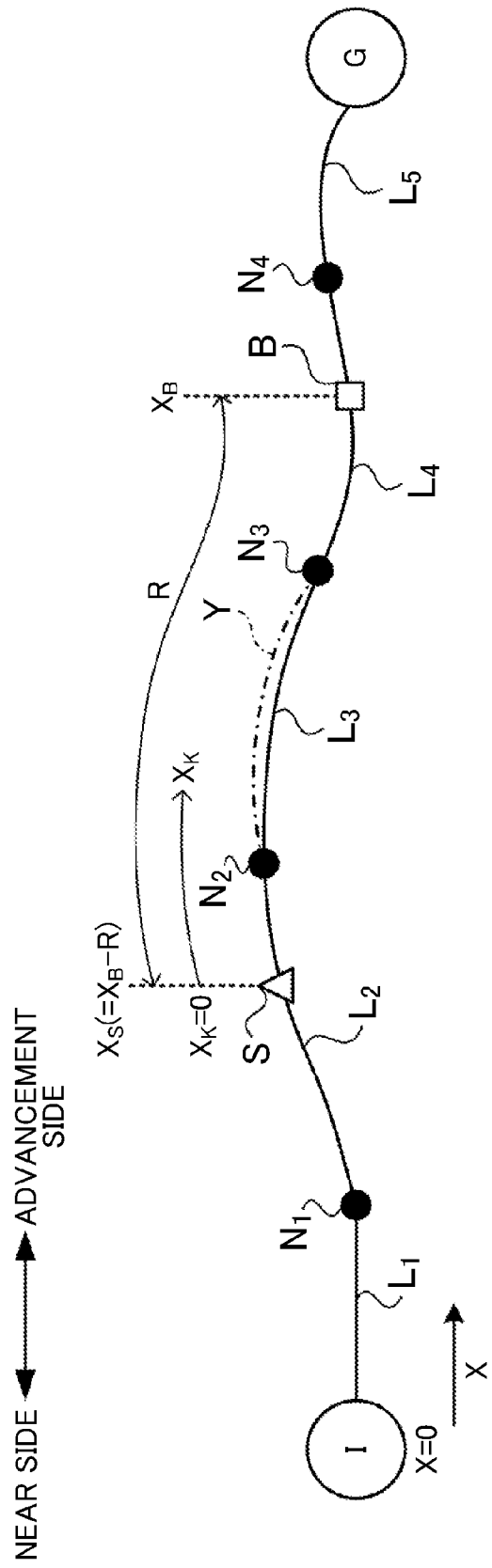
FIG. 2A is a pattern diagram showing a road.

The deceleration position and the reference position will be described briefly below. FIG. 2A is a pattern diagram showing a road. In FIG. 2A, it is assumed that the vehicle C starts to travel from a measurement start position I, travels through travel road segments L (L1 to L5), and travels to an end position G Further, the travel road segments L1 to L5 are connected by nodes N1 to N4 that correspond to intersections. A reference position S (a white triangle) is a position located a reference distance R on the near side of a deceleration position B (a white square). The reference position S is a position at which to start deceleration control for causing the vehicle C to decelerate at the deceleration position B. Note that starting the deceleration control does not necessarily mean starting to generate braking force, and may mean starting to monitor information relating to the vehicle C required to perform the deceleration control, for example. In this embodiment, the deceleration position B is a position in which the vehicle C stops, and is set as a position in which the vehicle speed of the vehicle C falls to or below a threshold (3 km/hour, for example) while decreasing by at least a predetermined value (20 km/hour, for example). Note that the deceleration position B may be a position in which the vehicle C starts to decelerate by at least a predetermined deceleration, a position in which the vehicle C starts to decelerate while the vehicle speed decreases by at least a predetermined value (20 km/hour, for example), and so on.

In this embodiment, the control unit 20 is capable of executing the deceleration control program 21 recorded in the recording medium 30, and in accordance with processing of the deceleration control program 21, the control unit 20 outputs a command to perform the deceleration control on the vehicle C to the ECU 44. For this purpose, the deceleration control program 21 includes a travel distance acquisition unit 21a, a measured distance recording unit 21b, a reference position setting unit 21c, and a deceleration control unit 21d.

The travel distance acquisition unit 21a is a program module that causes the control unit 20 to realize a function for obtaining a travel distance measured by a sensor of the vehicle C. In other words, the control unit 20 obtains the lifetime travel distance measured by the travel distance meter 45 via the ECU 44.

The measured distance recording unit 21b is a program module that causes the control unit 20 to realize a function for recording a measured distance X, which is a distance traveled from the predetermined measurement start position I, in the recording medium 30 for each travel road segment L through which the vehicle travels. In other words, in accordance with the functions of the measured distance recording unit 21b, the control unit 20 obtains the measured distance X of each travel road segment L by obtaining the lifetime travel distance from manufacture of the vehicle C in each travel road segment L, and subtracting the lifetime travel distance at the measurement start position I from the obtained lifetime travel distance.

Figure 2B:
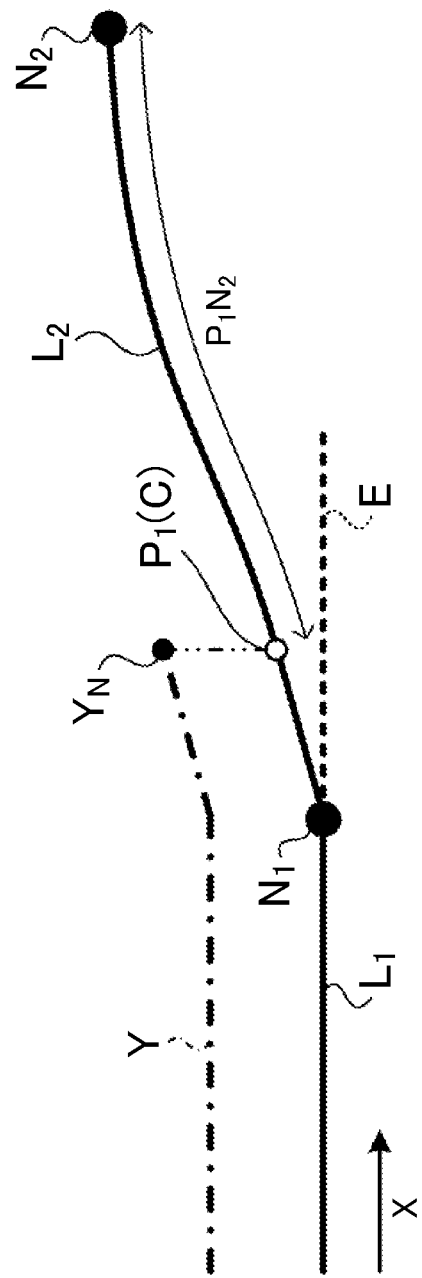
FIG. 2B is a pattern diagram showing a road.

Further, in accordance with the functions of the measured distance recording unit 21b, the control unit 20 records the measured distance X in a change position, which is a position where the travel road segment L changes, in the recording medium 30. In other words, the control unit 20 records the measured distance X in each position where the travel road segment L specified as the road segment in which the vehicle C is currently travelling changes. FIG. 2B is a pattern diagram showing a manner in which the travel road segment L2 is specified by map matching. The drawing shows a travel locus Y (dot-dash line) of the vehicle C while traveling through the travel road segment L2, which curves in a leftward direction following the straight travel road segment L1. A straight road segment E into which the vehicle C can advance directly from the travel road segment L1 is connected to the node N1 serving as the end point of the travel road segment L1. In this case, it is determined that the travel locus Y approximates the road shape of a road segment (L1+L2) rather than the road shape of a road segment (L1+E). Therefore, it is determined with a predetermined degree of confidence that the vehicle is traveling through the road segment L2 following the road segment L1 only when the vehicle C passes the node N1 and the travel locus corresponding to the road segment L2 is obtained. Accordingly, a change position P1 indicating a change between the travel road segments L1, L2 is set in a position further forward in the advancement direction of the vehicle C than the node N1 serving as the end point of the travel road segment L1.

Figure 2C:
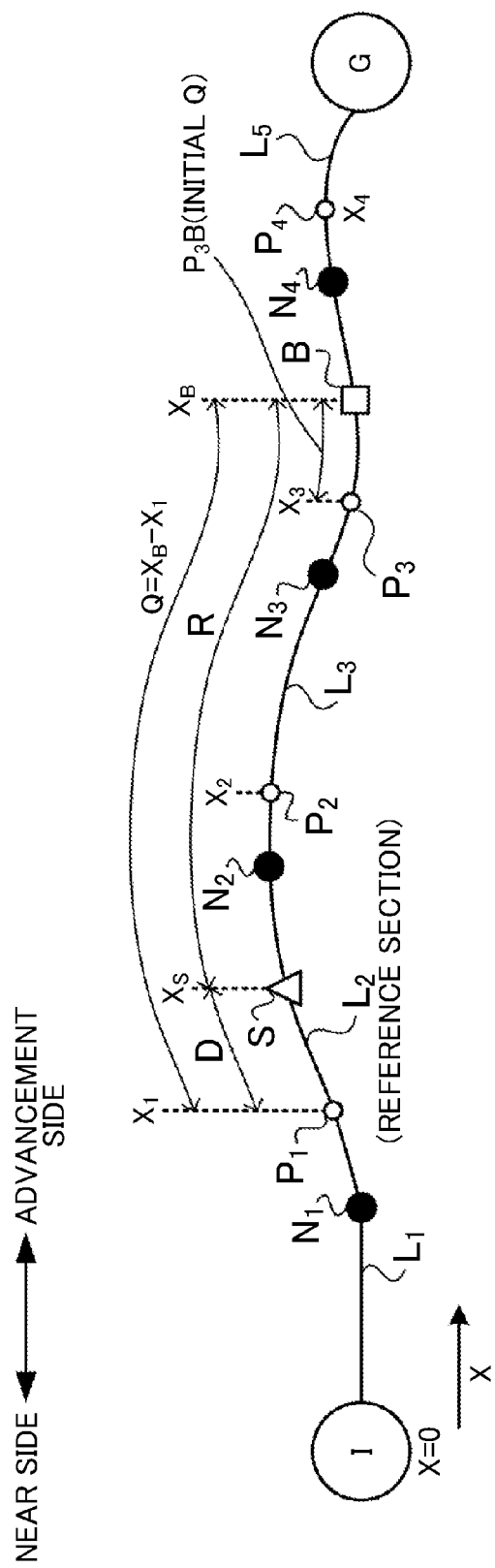
FIG. 2C is a pattern diagram showing a road.

FIG. 2C is a pattern diagram showing change positions P1 to P4 on the road shown in FIG. 2A. As shown in FIG. 2C, measured distances X1 to X4 are obtained respectively in relation to the change positions P1 to P4. In accordance with the functions of the measured distance recording unit 21b, the control unit 20 records the measured distances X1 to X4 in the measured distance DB 30b. FIG. 5 shows the measured distance DB 30b. As shown in FIG. 5, the travel road segments L2 to L4 that include the change positions P1 to P4 in which the measured distances X1 to X4 are measured are recorded in the measured distance DB 30b in association with the measured distances X1 to X4. Section lengths W2 to W4 of the travel road segments L2 to L4 corresponding to the measured distances X1 to X4 are also recorded in the measured distance DB 30b.

In accordance with the functions of the measured distance recording unit 21b, the control unit 20 records a distance-remaining-to-change PN, which is a distance from the change position P to the end point of the travel road segment L that includes the change position P, in the recording medium 30. As shown in FIG. 2B, the control unit 20 specifies, as the current position of the vehicle C, a position within the travel road segment L2 that is closest to a position of a most recent point YN of the travel locus Y of the vehicle C in a case where the travel locus Y is shifted such that the travel locus Y most closely approximates the travel road segments L1, L2. The current position when the travel road segment L1 changes to the travel road segment L2 serves as the change position P1. The control unit 20 obtains the distance through the travel road segment L2 from the change position P1 to the node N2 serving as the end point of the travel road segment L2 on the basis of the shape interpolation point data, and records this distance in the measured distance DB 30b as a distance-remaining-to-change P1N2.

The reference position setting unit 21c is a program module that causes the control unit 20 to realize a function for setting the reference position S, which is a position located the predetermined reference distance R on the near side of the deceleration position B in which the vehicle C decelerates, on the basis of the deceleration position B and the measured distance X. As shown in FIG. 2A and FIG. 2C, in accordance with the functions of the reference position setting unit 21c, the control unit 20 sets a position in which the measured distance X becomes smaller than a measured distance XB in the deceleration position B by the reference distance R as the reference position S. As shown in FIG. 2A, the control unit 20 sets a position in which the measured distance X reaches a measured distance XS (=XB−R), which is obtained by subtracting the reference distance R from the measured distance XB in the deceleration position B, as the reference position S.

Figure 3A:
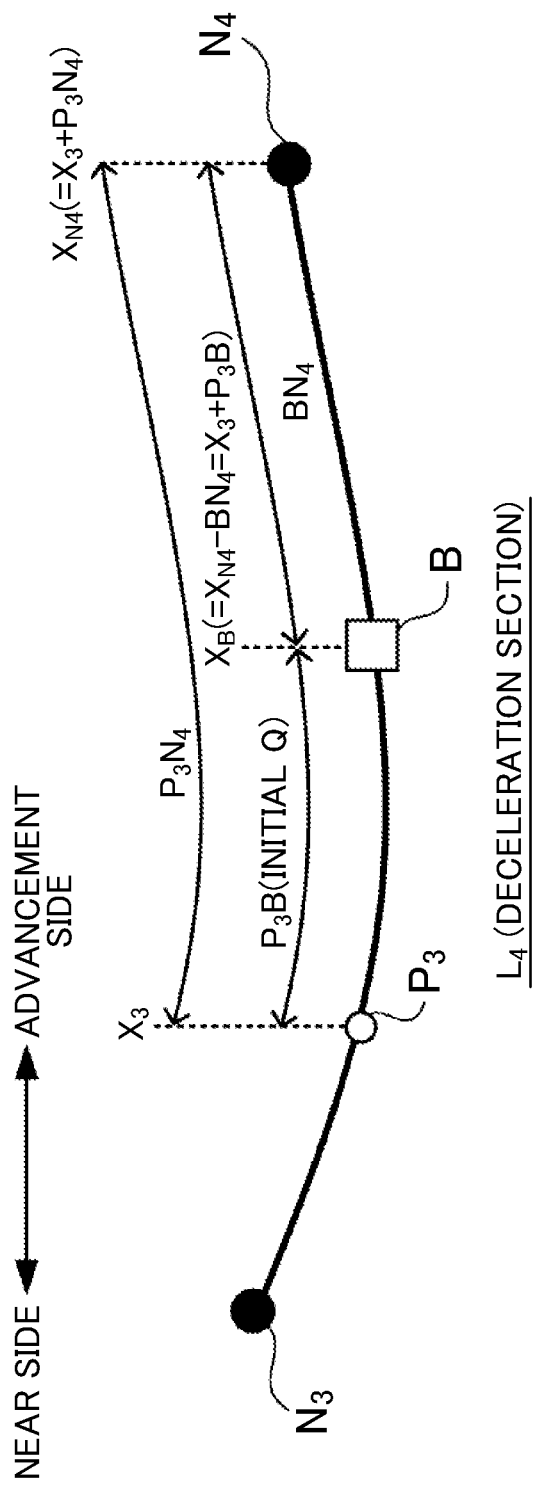
FIG. 3A is a pattern diagram showing a road.

In this embodiment, the measured distance XB in the deceleration position B is not recorded directly, and therefore the measured distance XB in the deceleration position B is estimated from another measured distance X. Estimation of the measured distance XB will be described below. FIG. 3A is an enlarged view of the travel road segment L4 that includes the deceleration position B shown in FIG. 2C. The travel road segment L4 that includes the deceleration position B may also be referred to below as the deceleration section L4.

As shown in FIG. 2C and FIG. 3A, in accordance with the functions of the reference position setting unit 21c, the control unit 20 considers the measured distance XB in the deceleration position B to be a distance (XN4−BN4) obtained by subtracting a distance-remaining-to-deceleration BN4, which is a distance between the deceleration position B and the end point of the travel road segment L4, the travel road segment including a change-position-immediately-preceding-deceleration P3 serving as the change position P through which the vehicle C travels immediately before the deceleration position B, from a distance (XN4=X3+P3N4) obtained by adding a distance-remaining-to-change P3N4 relating to the change-position-immediately-preceding-deceleration P3 to a measured distance X3 in the change-position-immediately-preceding-deceleration P3. Here, as shown in FIG. 3A, a distance (P3+P3N4) obtained by adding the distance-remaining-to-change P3N4 relating to the change-position-immediately-preceding-deceleration P3, through which the vehicle C travels immediately before the deceleration position B, to the measured distance X3 in the change-position-immediately-preceding-deceleration P3 may be considered as a measured distance XN4 at the node N4 serving as the end point of the travel road segment L4 (the deceleration section) that includes the change-position-immediately-preceding-deceleration P3. Further, a distance (XN4−BN4) obtained by subtracting the distance-remaining-to-deceleration BN4 between the deceleration position B and the node N4 serving as the end point of the travel road segment L4 that includes the change-position-immediately-preceding-deceleration P3 from the measured distance XN4 at the node N4 serving as the end point of the travel road segment L4 that includes the change-position-immediately-preceding-deceleration P3 may be considered as the measured distance XB in the deceleration position B. Hence, the measured distance XB in the deceleration position B can be estimated without directly recording the measured distance XB in the deceleration position B, whereupon the reference position S can be set on the basis of the measured distance XB in the deceleration position B.

Next, the reference position S will be described. As shown in FIG. 2C, the change position P1 that is closest to the deceleration position B, among the change positions P in which a difference relative to the measured distance XB in the deceleration position B is greater than the reference distance R, is set as a reference change position P1. In accordance with the functions of the reference position setting unit 21c, the control unit 20 sets, as the reference position S, a position advanced toward the deceleration position B side from the reference change position P1 by a subtracted distance D, which is a distance obtained by subtracting the reference distance R from a distance Q (=XB−X1), the distance Q being obtained by subtracting the measured distance X1 in the reference change position P1 from the measured distance XB in the deceleration position B. Here, as shown in FIG. 2C, the reference change position P1, i.e. the change position P that is closest to the deceleration position B among the change positions P in which the difference relative to the measured distance XB in the deceleration position B is greater than the reference distance R, is the change position P1 through which the vehicle C travels immediately before the reference position S. The distance Q (=XB−X1) obtained by subtracting the measured distance X1 in the reference change position P1 from the measured distance XB in the deceleration position B is considered as the travel distance between the reference change position P1 and the deceleration position B, and the subtracted distance D obtained by subtracting the reference distance R from this travel distance is considered as the distance between the reference change position P1 and the reference position S. Therefore, a position advanced toward the deceleration position B side from the reference change position P1 can be set as the reference position S.

FIG. 3B is an enlarged view of the travel road segment L1 that includes the reference position S shown in FIG. 2C. As shown in FIG. 2C and FIG. 3B, in accordance with the functions of the reference position setting unit 21c, the control unit 20 sets, as the reference position S, a position advanced toward the deceleration position B side from the node N1 serving as the start point of the travel road segment L2 that includes the reference change position P1 by a distance obtained by adding together the subtracted distance D and a distance (W2−P1N2) obtained by subtracting the distance-remaining-to-change P1N2 relating to the reference change position P1 from the section length W2 of the travel road segment L2 that includes the reference change position P1. The travel road segment L2 that includes the reference position S may be referred to below as the reference section L2. The control unit 20 calculates the distance (W2−P1N2) from the node N1 serving as the start point of the reference section L2 to the reference change position P1 by subtracting the distance-remaining-to-change P1N2 relating to the reference change position P1 from the section length W2 of the travel road segment L2. The control unit 20 then calculates the distance from the node N1 to the reference position S by adding the subtracted distance D, i.e. the travel distance between the reference change position P1 and the reference position S, to the distance (W2−P1N2) from the node N1 serving as the start point of the reference section L2 to the reference change position P1.

The deceleration control unit 21d is a program module that causes the control unit 20 to realize a function for performing deceleration control on the basis of the distance traveled from the reference position S. More specifically, as shown in FIG. 2A, in accordance with the functions of the deceleration control unit 21d, the control unit 20 obtains a control distance XK serving as the distance traveled from the reference position S after the current position of the vehicle C reaches the reference position S by subtracting the lifetime travel distance measured by the travel distance meter 45 at the point where the current position of the vehicle C reaches the reference position S from the lifetime travel distance measured by the travel distance meter 45. The control unit 20 then executes deceleration control on the vehicle C on the basis of the control distance XK.

FIG. 3C is a graph showing an example of deceleration control based on the control distance XK. As shown in the drawing, a target vehicle speed V is set for each control distance XK from the reference position S, and the control unit 20 issues a command to the ECU 44 to realize the target vehicle speed V. In this embodiment, deceleration control is executed when the control distance XK reaches the reference distance R so that the vehicle C stops upon arrival at the deceleration position B.

In this embodiment, as described above, the reference position S can be set on the basis of the measured distance X, i.e. the travel distance measured by the travel distance meter 45 in each travel road segment L1 to L5, instead of a distance on a map from the deceleration position B. Therefore, the reference position S can be set on the basis of the actual travel distance to the deceleration position B, and as a result, deceleration control can be performed appropriately on the basis of the control distance XK, i.e. the distance traveled from the reference position S.

In FIG. 2A, for example, when the travel road segment L3 is shaped as indicated by a solid line but the travel locus Y actually traveled by the vehicle C is shaped as indicated by a dot-dash line, the travel distance actually traveled by the vehicle C through the travel road segment L3 is greater than the section length W3 of the travel road segment L3. When the driver is in the habit of taking curves widely, for example, the travel distance actually traveled through the travel road segment L3 is highly likely to be greater than the section length W3 of the travel road segment L3. When, in this case, the reference position S is set on the near side of the deceleration position B by the reference distance R on the basis of the section length W3 of the travel road segment L3 indicated by the map information 30a, the reference position S is set too far from the deceleration position B, and therefore the vehicle C arrives at the deceleration position B after the control distance XK from the reference position S reaches the reference distance R, with the result that appropriate deceleration control cannot be realized on the basis of the control distance XK. Conversely, when the travel distance actually traveled by the vehicle C through the travel road segment L3 is smaller than the section length W3 of the travel road segment L3, the vehicle C arrives at the deceleration position B before the control distance XK from the reference position S reaches the reference distance R, and as a result, appropriate deceleration control cannot be realized on the basis of the control distance XK. A difference between the actual travel distance and the section length W in the map information 30a is likely to occur in a travel road segment L that includes a zebra crossing, a travel road segment L that includes a curve having a small curvature radius, a travel road segment L that includes a roundabout, and so on, for example.

By setting the position in which the measured distance X becomes smaller than the measured distance XB in the deceleration position B by the reference distance R as the reference position S, the control unit 20 can set the reference position S to be located the reference distance R from the deceleration position B on the basis of the measured distance X. Further, by recording the measured distance X in the change position P where the travel road segment L changes, the control unit 20 can record the measured distance X for each travel road segment L.

Furthermore, as shown in FIG. 3B, the control unit 20 sets, as the reference position S, a position advanced toward the deceleration position B side from the node N1 serving as the start point of the travel road segment L2 that includes the reference change position P1 by a distance obtained by adding together the subtracted distance D and the distance (W2−P1N2) obtained by subtracting the distance-remaining-to-change P1N2 relating to the reference change position P1 from the section length W2 of the travel road segment L2 (the reference section) that includes the reference change position P1. In so doing, the reference position S can be set using the position of the node N1 serving as the start point of the travel road segment L2 as a reference. In other words, the reference position S can be specified using the position of the node N1 serving as the start point of the travel road segment L2 as a reference, and therefore a determination as to whether or not the vehicle C has traveled through the reference position S can be made on the basis of a comparison between the shape of the travel road segment L2 specified by map matching and the shape of the travel locus Y. Hence, by obtaining the distance traveled by the vehicle C after travelling through the reference position S, the control distance XK, i.e. the distance traveled from the reference position S, can be obtained.

Next, processing executed by the control unit 20 in accordance with the deceleration control program 21 will be described. The control unit 20 executes measured distance recording processing and reference position setting processing.

Figure 4A:
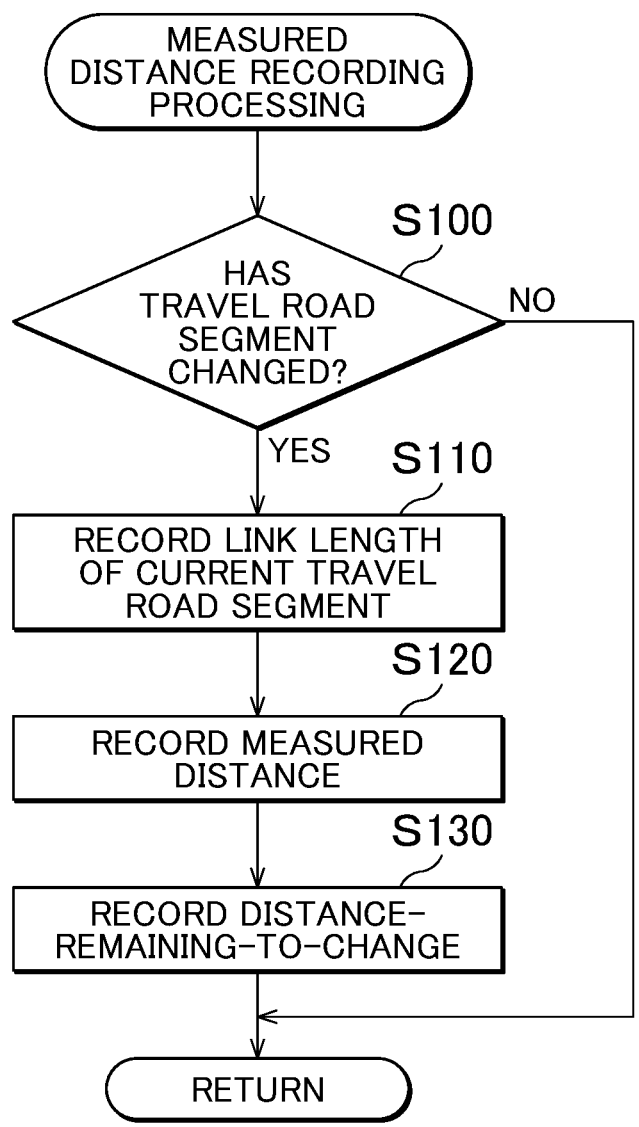
FIG. 4A is a flowchart showing measured distance recording processing.

FIG. 4A is a flowchart showing the measured distance recording processing. First, in accordance with the functions of the measured distance recording unit 21b, the control unit 20 determines whether or not the travel road segment L has changed (step S100). More specifically, the control unit 20 determines whether or not a change has occurred in the travel road segment L specified by map matching. After determining that the travel road segment L has changed (step S100: Y), the control unit 20 records the section length W of the current (post-change) travel road segment L in the measured distance DB 30b in accordance with the functions of the measured distance recording unit 21b (step S110).

Next, in accordance with the functions of the measured distance recording unit 21b, the control unit 20 records the measured distance X in the measured distance DB 30b (step S120). More specifically, the control unit 20 obtains the measured distance X to be recorded in the measured distance DB 30b by obtaining the lifetime travel distance at the point where the travel road segment L changes, and subtracting the lifetime travel distance in the measurement start position I from the obtained lifetime travel distance.

Next, in accordance with the functions of the measured distance recording unit 21b, the control unit 20 records the distance-remaining-to-change PN in the measured distance DB 30b (step S130). As shown in FIG. 2B, the control unit 20 obtains the distance within the travel road segment L2 from the current position (the change position P1) to the node N2 serving as the end point of the travel road segment L2 on the basis of the shape interpolation point data, and records this distance in the measured distance DB 30b as the distance-remaining-to-change P1N2.

By executing the measured distance recording processing described above every time the travel road segment L changes, the measured distance X and the distance-remaining-to-change PN can be recorded in the measured distance DB 30b in association with each other for each travel road segment L.

Figure 4B:
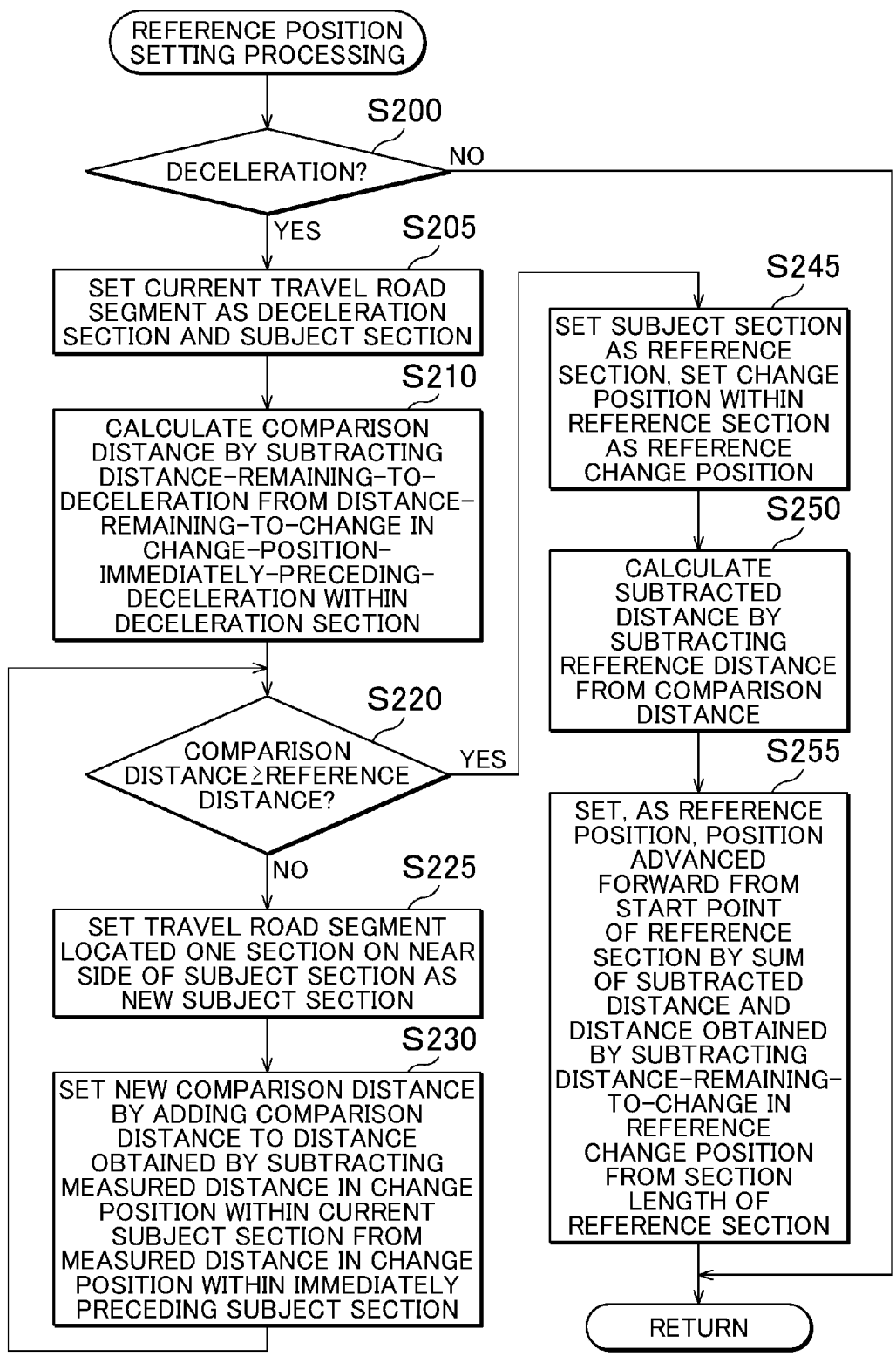
FIG. 4B is a flowchart showing reference position setting processing.

Next, the reference position setting processing for setting the reference position S in relation to each deceleration position B will be described. FIG. 4B is a flowchart showing the reference position setting processing. First, in accordance with the functions of the reference position setting unit 21c, the control unit 20 determines whether or not the vehicle C has decelerated (step S200). More specifically, the control unit 20 determines whether or not the vehicle speed of the vehicle C has fallen to or below a threshold (3 km/hour, for example) while decreasing by at least a predetermined value (20 km/hour, for example).

After determining that the vehicle C has decelerated (step S200: Y), the control unit 20 sets the current travel road segment L as the deceleration section and a subject section in accordance with the functions of the reference position setting unit 21c (step S205). As shown in FIG. 3A, the deceleration section is the travel road segment L4 that includes the deceleration position B. The subject section is the travel road segment L to be subjected to the reference position setting processing, and is shifted one section at a time (L4→L3→L2) toward the near side in order from the deceleration section L4 during processing to be described below.

Next, in accordance with the functions of the reference position setting unit 21c, the control unit 20 calculates a comparison distance Q by subtracting the distance-remaining-to-deceleration from the distance-remaining-to-change in the change-position-immediately-preceding-deceleration, i.e. the change position P in the deceleration section (step S210). In the case of FIG. 3A, the control unit 20 calculates the comparison distance Q (=P3B) by subtracting the distance-remaining-to-deceleration BN4 from the distance-remaining-to-change P3N4 in the change-position-immediately-preceding-deceleration P3 within the deceleration section L4. In other words, in the case of FIG. 3A, the control unit 20 calculates the comparison distance Q as the travel distance from the change-position-immediately-preceding-deceleration P3 to the deceleration position B. Here, the comparison distance Q refers to the travel distance from the change position P included in the subject section to the deceleration position B. The initial subject section is the deceleration section L4, and therefore the initial comparison distance Q is the travel distance from the change-position-immediately-preceding-deceleration P3 within the deceleration section L4 to the deceleration position B. The next subject section is the travel road segment L3, and therefore the next comparison distance Q is the travel distance from the change position P2 within the travel road segment L3 to the deceleration position B. Hence, the comparison distance Q gradually increases as the subject section shifts toward the near side.

Next, in accordance with the functions of the reference position setting unit 21c, the control unit 20 determines whether or not the comparison distance Q equals or exceeds the reference distance R (step S220). More specifically, the control unit 20 determines whether or not the comparison distance Q, i.e. the travel distance from the change position P included in the subject section to the deceleration position B, equals or exceeds the reference distance R. In the case of FIG. 2C, the initial subject section is the travel road segment L4 that includes the deceleration position B, and therefore the comparison distance Q (=P3B) does not equal or exceed the reference distance R.

After determining that the comparison distance Q does not equal or exceed the reference distance R (step S220: N), the control unit 20 sets the travel road segment L located one section on the near side of the subject section as the new subject section in accordance with the functions of the reference position setting unit 21c (step S225). In the case of FIG. 2C, the initial subject section is the deceleration section L4 that includes the deceleration position B, and therefore, when the comparison distance Q (=P3B) does not equal or exceed the reference distance R, the travel road segment L3 located one section toward the near side is set as the new subject section.

Next, in accordance with the functions of the reference position setting unit 21c, the control unit 20 sets a new comparison distance Q by adding a distance obtained by subtracting the measured distance X in the change position P within the current subject section from the measured distance X in the change position P within the immediately preceding subject section to the comparison distance Q (step S230). In a case where the travel road segment L3 is set as the new subject section, a distance (P3B+(X3−X2)) obtained by adding the original comparison distance Q (=P3B) to a distance (X3−X2) obtained by subtracting the measured distance X2 in the change position P2 within the travel road segment L2 serving as the current subject section from the measured distance X3 in the change position P3 within the deceleration section L4 serving as the immediately preceding subject section is set as the new comparison distance Q.

Next, the control unit 20 returns to step S220. In other words, the control unit 20 determines whether or not the new comparison distance Q equals or exceeds the reference distance R. By executing the processing described above repeatedly, the subject section can be shifted toward the near side one section at a time until the new comparison distance Q equals or exceeds the reference distance R. As a result, a distance obtained by subtracting the measured distance X in the change position P within the current subject section from the measured distance X in the change position P within the immediately preceding subject section is added sequentially to the comparison distance Q. In the case of FIG. 2C, the new comparison distance Q (=P3B+(X3−X2)+(X2−X1)=P3B+X3−X1) equals or exceeds the reference distance R when the travel road segment L2 becomes the current subject section.

After determining that the comparison distance Q equals or exceeds the reference distance R (step S220: Y), the control unit 20 sets the current subject section as the reference section and sets the change position P within the reference section as the reference change position in accordance with the functions of the reference position setting unit 21c (step S245). In the case of FIG. 2C, the new comparison distance Q (=P3B+X3−X1=XB−X1) equals or exceeds the reference distance R when the travel road segment L2 becomes the current subject section, whereby the travel road segment L2 becomes the reference section L2 and the change position P1 within the reference section L2 becomes the reference change position P1. Here, a case where the comparison distance Q equals or exceeds the reference distance R indicates a case where the change position P1 that is closest to the deceleration position B among the change positions P in which the difference relative to the measured distance XB in the deceleration position B is greater than the reference distance R, or in other words the reference change position P1, is included in the subject section, and the reference position S is set within the current subject section.

Next, as shown in FIG. 2C, in accordance with the functions of the reference position setting unit 21c, the control unit 20 calculates the subtracted distance D by subtracting the reference distance R from the comparison distance Q (step S250). Further, as shown in FIG. 3B, in accordance with the functions of the reference position setting unit 21c, the control unit 20 sets a position advanced forward from the node N1 serving as the start point of the reference section L2 by the sum of the subtracted distance D and the distance obtained by subtracting the distance-remaining-to-change P1N2 in the reference change position P1 from the section length W2 of the reference section L2 as the reference position S (step S255). As a result, the position in which the measured distance X (=XB−R) becomes smaller than the measured distance XB in the deceleration position B by the reference distance R can be set as the reference position S.

The embodiment described above is an example embodiment of the invention, and other embodiments may be employed as embodiments of the invention. For example, the control unit 20 may record the measured distance XB in the deceleration position B in the recording medium 30. In this case, the measured distance XB in the deceleration position B can be obtained without performing the calculations shown in FIG. 3A, and therefore the reference position S can be set more easily. Further, the reference position S does not necessarily have to be set using deceleration as a trigger, and may be set when a processing load of the navigation terminal 10 is small or when the power supply of the navigation terminal 10 is switched OFF. Moreover, the reference position S does not necessarily have to be set by the navigation terminal 10 installed in the vehicle C, and may be set in a server or the like that is capable of receiving the measured distance DB 30b from the vehicle C.

Here, the sensor of the vehicle may be a sensor that measures the rotation speed of the member that connects the vehicle wheels of the vehicle such that the speed of the vehicle is calculated from the rotation speed first and then the travel distance is calculated from the calculated speed. The travel distance is a distance obtained by measuring the distance traveled by the vehicle during each travel period, and may be obtained from the vehicle by travel distance obtaining means, for example. Further, the travel distance does not necessarily have to be calculated in the vehicle, and may be calculated by travel distance obtaining means provided in an in-vehicle terminal capable of obtaining the aforesaid rotation speed and speed from the vehicle. A travel distance from an initial travel start position of the vehicle or a travel distance from a position in which a trip meter is operated is typically measured in the vehicle, but the deceleration control system may be made capable of obtaining the travel distance from any desired position.

Meanwhile, the measured distance is the travel distance from the measurement start position, and the measurement start position may be at least a position through which the vehicle travels before reaching the start point of the travel road segment in which the reference position is set. Needless to mention, the measurement start position may be set at a travel distance from the initial travel start position of the vehicle or a travel distance from a position in which the power supply of the deceleration control system is switched ON. Measured distance recording means may record the measured distance in the recording medium for each travel road segment through which the vehicle travels, and the travel road segments may be any road segments divided according to predetermined rules. For example, the travel road segments may be sections divided by intersections or sections divided at predetermined distance intervals. Further, the measured distance recording means may record the measured distance in the recording medium every time the vehicle travels through the end point of the travel road segment, or may record the measured distance in the recording medium every time the vehicle travels through an intermediate point of the travel road segment.

The deceleration position in which the vehicle decelerates may be any position serving as a control target for deceleration control, and may be a position in which the vehicle stops decelerating. For example, the deceleration position may be a position in which the vehicle reaches a vehicle speed at which the vehicle is considered to have stopped, or a position in which the vehicle starts to accelerate following deceleration. Further, the deceleration position may be a position in which the vehicle starts to decelerate. Reference position setting means may set the reference position on the basis of the deceleration position and the measured distance, and the reference position may be set on the near side of the deceleration position by a predetermined reference distance on the basis of the measured distance recorded for each travel road segment. Deceleration control means may perform deceleration control on the basis of the distance traveled from the reference position, and a control target within a control section extending from the reference position to the deceleration position may be set for each distance traveled from the reference position. For example, a target vehicle speed or a target deceleration may be set as the control target for each distance traveled from the reference position.

More specifically, the reference position setting means may set a position in which the measured distance becomes smaller than the measured distance in the deceleration position by the reference distance as the reference position. In so doing, a reference position located on the near side of the deceleration position by the reference distance can be set on the basis of the measured distance. Note that instead of recording the measured distance in the recording medium for each travel road segment, the measured distance in the deceleration position may be recorded in the recording medium. In this case, the measured distance in the deceleration position can be obtained from the recording medium, and therefore the reference position in which the measured distance becomes smaller than the measured distance in the deceleration position by the reference distance can be specified more easily.

Further, the travel road segment may be specified on the basis of the travel locus of the vehicle and the map information. More specifically, a method of specifying the travel road segment on the basis of the travel locus of the vehicle and the map information may be employed in the deceleration control system as a method of specifying the travel road segment. For example, a conventional map matching method may be employed such that the travel road segment is specified when a degree of similarity between the travel locus of the vehicle and the shape of the travel road segment indicated by the map information equals or exceeds a predetermined reference value. The measured distance recording means may record the measured distance in the change position, i.e. the position in which the travel road segment changes, in the recording medium, and the measured distance may be recorded for each position in which the travel road segment specified as the current travel road segment of the vehicle changes. In so doing, the measured distance can be recorded in advance for each travel road segment. Here, the travel road segment is specified in a condition where the travel locus through the travel road segment has been obtained to a certain extent, and therefore the change position in which the specified travel road segment changes may be set in a position deviating toward the advancement side in a travel direction from the start point of the travel road segment. Even when the change position deviates toward the advancement side in the travel direction from the start point of the travel road segment in this manner, the measured distance can be recorded for each travel road segment in advance.

Furthermore, the measured distance recording means may record the distance-remaining-to-change, i.e. the distance from the change position to the end point of the travel road segment that includes the change position, in the recording medium. The reference position setting means may then consider the measured distance in the deceleration position to be the distance obtained by subtracting the distance-remaining-to-deceleration, i.e. the distance from the deceleration position to the end point of the travel road segment that includes the change-position-immediately-preceding-deceleration, i.e. the change position through which the vehicle travels immediately before reaching the deceleration position, from the distance obtained by adding the distance-remaining-to-change relating to the change-position-immediately-preceding-deceleration to the measured distance in the change-position-immediately-preceding-deceleration. Here, the distance obtained by adding the distance-remaining-to-change relating to the change-position-immediately-preceding-deceleration, through which the vehicle travels immediately before reaching the deceleration position, to the measured distance in the change-position-immediately-preceding-deceleration may be considered to be the measured distance at the end point of the travel road segment that includes the change-position-immediately-preceding-deceleration. Moreover, the distance obtained by subtracting the distance-remaining-to-deceleration between the deceleration position and the end point of the travel road segment that includes the change-position-immediately-preceding-deceleration from the measured distance at the end point of the travel road segment that includes the change-position-immediately-preceding-deceleration may be considered to be the measured distance in the deceleration position. Accordingly, the measured distance in the deceleration position can be estimated without directly recording the measured distance in the deceleration position, whereupon the reference position can be set on the basis of the measured distance in the deceleration position.

Further, when the change position that is closest to the deceleration position, among the change positions in which the difference relative to the measured distance in the deceleration position is greater than the reference distance, is set as the reference change position, the reference position setting means may set a position advanced toward the deceleration position side from the reference change position by the subtracted distance as the reference position, the subtracted distance being a distance obtained by subtracting the reference distance from the distance obtained by subtracting the measured distance in the reference change position from the measured distance in the deceleration position. Here, the reference change position, i.e. the change position that is closest to the deceleration position among the change positions in which the difference relative to the measured distance in the deceleration position is greater than the reference distance, is the change position through which the vehicle travels immediately before reaching the reference position. The distance obtained by subtracting the measured distance in the reference change position from the measured distance in the deceleration position corresponds to the travel distance from the reference change position to the deceleration position, and therefore the subtracted distance obtained by subtracting the reference distance from this travel distance may be considered to be the distance between the reference change position and the reference position. Therefore, a position advanced toward the deceleration position side from the reference change position may be set as the reference position.

Furthermore, the reference position setting means may set, as the reference position, a position advanced toward the deceleration position side from the start point of the travel road segment that includes the reference change position by the distance obtained by adding together the subtracted distance and the distance obtained by subtracting the distance-remaining-to-change relating to the reference change position from the section length of the travel road segment that includes the reference change position. In so doing, the reference position can be set using the position of the start point of the travel road segment as a reference. In other words, the reference position can be specified using the position of the start point of the travel road segment as a reference, and therefore the determination as to whether or not the vehicle has traveled through the reference position can be made on the basis of a comparison between the shape of the travel road segment specified by map matching and the shape of the travel locus. Hence, by obtaining the distance traveled by the vehicle after travelling through the reference position, the deceleration control means can obtain the distance traveled from the reference position.

Further, the method of setting the reference position on the basis of the measured distance can also be applied in the form of a program or a method. Moreover, the system, program, and method described above may be realized in various forms, for example as an independent apparatus or using components shared by respective parts of the vehicle. For example, a deceleration control system or a navigation system, a method, and a program that include an apparatus such as that described above may be provided. Furthermore, modifications such as forming a part of the system from software and another part from hardware may be implemented as appropriate. Moreover, the system, program, and method described above may be provided in the form of a recording medium on which a program for controlling an apparatus is recorded. Needless to mention, the recording medium on which the software is recorded may be a magnetic recording medium or a magneto-optical recording medium, and it is assumed that it will be possible to apply the recording medium in an identical manner to any recording medium developed in the future.

What is claimed is:

1. A deceleration control system for use with a vehicle having a sensor, the deceleration control system comprising:
    a memory, and
    a processor programmed to:
        acquire a travel distance measured by the sensor of the vehicle;
        record a measured distance in the memory for each travel road segment through which the vehicle travels, the measured distance being the travel distance from a predetermined measurement start position that is determined based on an actual travel distance of the vehicle;
        set a reference position based on the measured distance and a deceleration position in which the vehicle decelerates, the reference position being a position located on a near side of the deceleration position by a predetermined reference distance; and
        perform deceleration control in response to the vehicle reaching the reference position.

2. The deceleration control system according to claim 1, wherein
    the processor sets the reference position to a position in which the measured distance is smaller than the measured distance in the deceleration position by the reference distance.

3. The deceleration control system according to claim 1, wherein
    the travel road segment is specified based on a travel locus of the vehicle and map information, and
    the processor records the measured distance in a change position in the memory, the change position being a position where the travel road segment changes.

4. The deceleration control system according to claim 3, wherein
    the processor records a distance-remaining-to-change in the memory, the distance-remaining-to-change being a distance from the change position to an end point of the travel road segment that includes the change position, and
    the processor determines the measured distance in the deceleration position to be a distance obtained by subtracting:
        (A) a distance-remaining-to-deceleration from (B) a distance obtained by adding the distance-remaining-to-change relating to a change-position-immediately-preceding-deceleration to the measured distance in the change-position-immediately-preceding-deceleration, and
    the distance-remaining-to-deceleration is a distance from the deceleration position to the end point of a travel road segment that includes a change-position-immediately-preceding-deceleration, which is the change position through which the vehicle travels immediately before reaching the deceleration position.

5. The deceleration control system according to claim 3, wherein,
    when the change position that is closest to the deceleration position, among change positions in which a difference relative to the measured distance in the deceleration position is greater than the reference distance, is set as a reference change position, the processor sets:

a position advanced toward a deceleration position side from the reference change position by a subtracted distance as the reference position, the subtracted distance being a distance obtained by subtracting the reference distance from a distance obtained by subtracting the measured distance in the reference change position from the measured distance in the deceleration position.

6. The deceleration control system according to claim 5, wherein the processor sets, as the reference position, a position advanced toward the deceleration position side from a start point of the travel road segment that includes the reference change position by a distance obtained by adding together the subtracted distance and a distance obtained by subtracting the distance-remaining-to-change relating to the reference change position from a segment length of the travel road segment that includes the reference change position.

7. A deceleration control method for use with a vehicle having a sensor, the deceleration control method comprising:

acquiring a travel distance measured by the sensor of the vehicle;

recording a measured distance in a memory for each travel road segment through which the vehicle travels, the measured distance being the travel distance from a predetermined measurement start position that is determined based on an actual travel distance of the vehicle;

setting a reference position based on the measured distance and a deceleration position in which the vehicle decelerates, the reference position being a position located on a near side of the deceleration position by a predetermined reference distance; and performing deceleration control in response to the vehicle reaching the reference position.

8. A non-transitory computer-readable medium that stores a deceleration control program for use with a vehicle having a sensor, the deceleration control program comprising:

acquiring, by a computer, a travel distance measured by the sensor of the vehicle;

recording, by the computer, a measured distance in a memory for each travel road segment through which the vehicle travels, the measured distance being the travel distance from a predetermined measurement start position that is determined based on an actual travel distance of the vehicle;

setting, by the computer, a reference position based on the measured distance and a deceleration position in which the vehicle decelerates, the reference position being a position located on a near side of the deceleration position by a predetermined reference distance; and performing, by the computer, deceleration control in response to the vehicle reaching the reference position.

\* \* \* \* \*